United States Patent

[11] 3,627,095

[72] Inventors Vadake R. Srinivasan;
Clayton D. Callihan, both of Baton Rouge, La.
[21] Appl. No. 847,719
[22] Filed Aug. 5, 1969
[45] Patented Dec. 14, 1971
[73] Assignee The Louisiana State University Foundation
Baton Rouge, La.

[54] NUTRITIVE PROTEIN FROM CELLULOSE
6 Claims, No Drawings
[52] U.S. Cl. ..................................................... 195/33,
99/9, 99/14, 71/9, 195/111
[51] Int. Cl. ..................................................... C12d 13/00
[50] Field of Search ........................................... 195/1, 8, 9,
33, 111; 99/2, 9; 71/9, 10, 11–70; 200/212

[56]  References Cited
UNITED STATES PATENTS
2,764,487  9/1956  Wickerham et al. ...........  195/111
OTHER REFERENCES
Han et al., Opp. Micro, Vol. 16, p. 1140–1145, 1968
Beljanski et al., Chem. Abs. Vol. 52, 18658 H, 1958.
Tatevosyan et al., Chem. Abs., Vol. 65, 2469 C, 1966
Kremnev et al., Chem. Abs, Vol. 59, 11747 h, 1963

Primary Examiner—A. Louis Monacell
Assistant Examiner—Gary M. Nath
Attorney—Stowell & Stowell ABSTRACT: Comestible, digestible protein is produced from cellulose by the combined cultivation of a cellulase-elaborating micro-organism and *ALCALIGENES FAECALIS* on delignified cellulose. The resultant protein is high in nutritive value and is suitable for use as an animal feedstuff.

NUTRITIVE PROTEIN FROM CELLULOSE

In view of the general availability of cellulosic materials and the comparative shortage of edible protein, the desirability of using the carbohydrate content of cellulose as a substrate for cultivation of protein-producing organisms is readily apparent. However, certain practical difficulties must be overcome before the nutrient energy values available in cellulose carbohydrate can be efficiently utilized. First, cellulose is generally accompanied in nature by lignin, which encapsulates the cellulose fibriles with a protective wall permeable only by powerful acids, alkalis, or special pulping reagents. Secondly, native cellulose occurs in a highly crystalline form, the crystal lattice of which resists penetration by most chemical reagents and enzymes. Thirdly, the connecting linkage which joins the simple sugar units into the long chains of molecules of cellulose resists normal metabolism by all but ruminant animals.

In a paper by Han et al., Applied Microbiology, Vol. 16, pages 1140–1145 (1968), there is described a process for converting cellulose to protein by means of micro-organisms. Cellulase-elaborating bacteria, particularly of the genus Cellulomonas, were cultivated on a cellulose substrate. The harvested bacterial cells were high in nutritive protein content and were useful as an animal feedstuff or feedstuff supplement. We have now discovered that improved yields of nutritive protein ate obtained when the cellulase-elaborating organism is cultivated on delignified cellulose concurrently with the cultivation of Alcaligenes faecalis.

It is, therefore, a principal object of the present invention to provide an improved method for converting cellulose to protein by means of micro-organisms. It is a further object of the invention to provide comestible, digestible protein high in nutritive value.

Accordingly, the present invention is a method for the preparation of nutritive protein from cellulose which comprises cultivating a cellulase-elaborating micro-organism and Alcaligenes faecalis on delignified cellulose under submerged aerobic conditions in an aqueous nutrient medium at a pH between about 5–9 and at a temperature between 25°–65° C.

As noted above, native cellulose is resistant to attack by micro-organisms and delignified cellulose is used as the cellulose substrate in practicing the method of the present invention invention. Delignified may be effected by any conventional means such as by treatment with acid, alkali and pulping-type reagents. Such treatment breaks down the protective lignin wall generally found in conjunction with native cellulose and destroys a large portion of the crystallinity associated with native cellulose. It is apparent that regenerated cellulose, chemical cellulose and delignified cellulose from any source may be utilized in practicing the present invention.

Among the many available cellulosic materials which are advantageously employed are cotton linters, bagasse, rice straw, sawdust, Johnson grass, prairie grass, alfalfa meal, cottonseed hulls, corn cobs, oat straw, wheat straw, and sorgum bagasse. Waste cellulose is often preferred, since it represents a very little cost; and little preference, if any, as to the source of of the cellulose is shown by the process of the present invention. Among the waste cellulose which may be advantageously employed with proper treatment are industrial cellulosic wastes such as packaging materials, oversize and improperly printed books and magazines; agricultural wastes such as bagasse, and general wastes such as paper bags, newspapers, disposable diapers, etc.

In a preferred delignification procedure, the cellulosic material is first contacted with an aqueous alkali, preferably an aqueous alkali metal hydroxide having a concentration of about 2–50 percent by weight of the alkali metal hydroxide and then oxidized. The alkaline contact may be effected by immersing the cellulosic material in its natural form (stalk, hull, fiber, blade, etc.) in a tank or vat containing the aqueous alkali. Preferably, however, the cellulosic material is first ground or cut or pulverized into smaller pieces in order to afford a more intimate contact between the cellulosic material and the aqueous alkali in which it is immersed. On the other hand, the aqueous alkali may be brushed on or sprayed on the cellulosic material in either its natural or comminuted form. The aqueous alkali employed may be a water solution of any of the strong alkalis readily available. Most advantageously employed are the hydroxides of the alkali metals, especially sodium hydroxide. In order to facilitate the subsequent oxidation of the cellulosic material, the aqueous alkali may contain traces of an oxidation catalyst, such as cobalt chloride.

The cellulosic material is then separated from the aqueous alkali, preparatory to oxidation. The separation may be accomplished by any of the standard methods known in the art: e.g., filtration, decantation, centrifugation, etc. A most efficient method to employ, however, when ground cellulosic material is utilized as the starting material, is to pump the aqueous alkali-ground cellulosic material slurry onto a continuously moving screen where most of the aqueous alkali is allowed to drain off and return to the alkali tank or vat for reuse. The screen is then allowed to pass under squeeze rolls, where pressure is applied to remove any excess alkali solution remaining with the cellulosic material. This pressed cellulose is then placed in the oxidation oven heated to 25°–100° C. and supplied with a constant supply of air to hasten the oxidation and hydrolysis which are occurring. The length of time that the alkali-contacted cellulosic material is allowed to remain in the oxidation oven is not critical, times of from 1 minute to several hours and longer have been employed. Whereas the longer residence times afford a more complete consumption of the cellulose by the micro-organisms in a subsequent step of the process of this invention, the shorter residence times are more economical, and are generally, therefore more desirable.

The oxidized, alkali-treated cellulose leaving the oxidation oven may be fed directly into a fermenter or more preferably, it is to be first neutralized before entry into the fermenter. Such neutralization is conveniently accomplished by placing the oxidized, alkali-contacted cellulose into a tank containing an aqueous solution of a fluid proton donor, such as hydrochloric or nitric acids, the amount which is carefully adjusted to maintain the hydrogen ion concentration within the tank near neutrality. Agitation is supplied, and after neutralization has been effected, the cellulosic material is separated by standard techniques from the neutralization medium and placed into the fermenter.

Generally speaking, the delignified cellulose, preferably washed free of spent reagents where utilized is mixed with a suitable nutrient media in a fermentation vessel provided with a draft tube and air lift to aerify and agitate the contents thereof. A suitable nutrient media for the preferred Cellulomonas organisms consists of mineral salt solution supplemented with 0.05–0.1 percent of yeast extract or thiamine. The system at a pH of 5–9, preferably sterilized by heating, is brought to a temperature between 25°–65° C. and sparged with air preparatory to inoculation with the desired micro-organisms.

Any cellulase-elaborating micro-organism may be used in conjunction with Alcaligenes faecalis as the inoculant in practicing the method of the present invention. Cellulase elaborating micro-organisms of the genus Cellulomonas are preferred, particularly the Cellulomonas species available from the Department of Microbiology at the Louisiana State University and from the American Type Culture Collection (ATCC No. 21399). A particularly preferred strain of Alcaligenes faecalis is also available from these same sources (ATCC No. 21400).

The method of the present invention may be operated continuously or as a batch process. When operated as a batch process, the optimum residence time in the fermenter is between 2 and 4 days. In continuous operation, a residence time greater than the mass doubling time is satisfactory; a residence time of 1.1 to 1.4 times the mass doubling time is preferable. After the cell concentration has reached the desired level (as determined by optical density measurements of the aqueous phase in the fermentation chamber), it is maintained thereat by adjusting the rate of addition of further delignified cellulose and additional nutrient medium. In either case, the temperature the fermenter is regulated at 25°–65° with 30°–35° C. being preferred, and the pH is kept within the range 5–9 with a pH of 7 being preferred. Air is continuously introduced, and thorough agitation is continuously supplied.

When the fermenter product is removed, (in batch processes, after the appropriate time has expired; in continuous processes, continuously after the appropriate incubation period), it is decanted or filtered or centrifuged to remove any undigested cellulose and a large portion of the lignin present. The supernatant of filtrate, as the case may be, contains the micro-organism; and it may be utilized as such as a food or food supplement, or the micro-organisms may be harvested by any of several techniques. Advantageously, the micro-organisms are allowed to settle in a continuous thickener, the underflow of which is transmitted to a high-speed centrifuge for further thickening or directly to a spray dryer for final drying. It has been found highly desirable to treat the supernatant or filtrate, as the case may be, with an aqueous solution of a fluid proton donor, (such as hydrochloric or nitric acids, in an amount sufficient to bring the pH of such supernatant of filtrate to a value between about 1.5 and about 6.5, whereby subsequent thickening and final removal of water to recover and utilize the micro-organisms are facilitated.

The product from the final drying process is found to have a total nitrogen content of about 8 percent as determined by Kjeldahl analysis, and a total protein content of approximately 50 percent. The amino acid composition of the product was found to be properly balanced, indicative of a highly valuable nutritive protein.

The following examples, wherein all parts and percentages are to be taken by weight, illustrate the instant invention, but are not to be construed as limiting its scope.

EXAMPLE 1

Seven hundred sixty parts of sugar cane bagasse was slurried in 8 percent aqueous sodium hydroxide for 1 hour at room temperature. Excess liquid was expressed by passing the slurry between rubber squeeze rolls and the residual solid spread out to a thin layer on a wire screen and heated in a hot air oven at 110° C. for 15 minutes. The partially dried material was placed in a fermentation vessel and diluted to 193.1 liters with a sterile aqueous solution and sufficient hydrochloric acid to effect neutralization and maintain the solution at the neutral point. The solution utilized contained nutrient salts calculated to have the final charge contains

| | |
|---|---|
| NaCl | 900 g. |
| $(NH_4)_2SO_4$ | 194 g. |
| $KH_2PO_4$ | 97 g. |
| $K_2HPO_4$ | 97 g. |
| $MgSO_4$ | 19.4 g. |
| $CaCl_2$ | 19.4 g. |
| Yeast Extract | 60.0 g. |

The charged fermenter was sealed and sufficient heat applied to keep its contents from boiling vigorously for 3 hours. At the end of this sterilization period, the heat was turned off and air was introduced slowly through a sparger in the bottom of the vessel. When the temperature reached 32° C., one liter of inoculum containing Cellulomonas species (ATCC No. 21399) and the *Alcaligenes faecalis* strain (ATCC No. 21400) was added via a sterile seal. Aeration was set at 34 liters per minute and the fermentation was allowed to proceed for a total of 90.25 hours at 32° C. After seperating unreacted cellulose and harvesting the bacterial cells produced, it was found that 738 grams or 97.2 percent of the initially insoluble cellulose had been solubilized and that the yield of bacterial cells was 370 grams. These cells contained 50.2 percent total protein based on Kjeldahl nitrogen analysis. The amino acid distribution of the protein, determined using a Beckman model 116 Amino Acid Analyzer after first hydrolysing the protein in 6N hydrochloric acid for 22 hours at 110° C. was as follows:

g./100 g. protein

| | |
|---|---|
| Arginine | 5.3 |
| Histidine | 2.3 |
| Isoleucine | 6.0 |
| Leucine | 10.0 |
| Lysine | 6.5 |
| Methionine | 2.0 |
| Phenylalanine | 5.8 |
| Tyrosine | 2.7 |
| Threonine | 8.3 |
| Valine | 5.6 |

Animal growth experiments were conducted to determine the digestibility of the protein. Male weanling rats of the Sprague-Dawley strain were fed ad libitum over a 10 day period an otherwise adequate but protein-free diet or the same basal diet containing 10, 20 or 40 percent crude protein produced by fermentation. All rats receiving more than 20 percent of this protein in their diet showed a weight increase for the 10-day period, while those on the diet containing no protein supplement showed a net weight loss for the same period. No toxicity was observed at any feeding level.

EXAMPLE 2

In another series of experiments, the Cellulomonas and *Alcaligenes faecalis* organisms were grown individually and then together in an identical salt solution medium containing yeast extract. Carboxymethylcellulose, a soluble cellulose derivate, was utilized as the cellulose source so that the cell production rate could be more readily followed by optical density measurements. The medium was made up to contain per 100 milliliters of solution:

| | |
|---|---|
| NaCl | 0.60 g. |
| $(NH_4)_2SO_4$ | 0.10 g. |
| $KH_2PO_4$ | 0.05 g. |
| $K_2HPO_4$ | 0.05 g. |
| $MgSO_4$ | 0.01 g. |
| $CaCl_2$ | 0.01 g. |
| Yeast Extract | 1.00 g. |

The solution was loaded into shake flasks, sealed with a porous stopper, sterilized at 121° C. for 30 minutes and cooled to 32° C. One set of flasks was inoculated with 10 milliliters of a suspension containing Cellulomonas bacteria (ATCC No. 21399). A second set of of flasks was inoculated with 10 milliliters of a suspension containing *Alcaligenes faecalis* (ATCC No. 21400). In a third set of flasks, the inoculum was a mixed culture of these two organisms The flasks were incubated with shaking at 32° C. and the rate of cell growth followed by optical density measurements. The results obtained are summarized below:

| Cellulomonas | | Alcaligenes | | Mixed | |
|---|---|---|---|---|---|
| time (hrs.) | optical density | time (hrs.) | optical density | time (hrs.) | optical density |
| 15 | 0.005 | 15 | 0.007 | 15 | 0.010 |
| 20 | 0.010 | 20 | 0.007 | 20 | 0.020 |
| 25 | 0.014 | 25 | 0.007 | 30 | 0.063 |
| 30 | 0.018 | 30 | 0.007 | 30 | 0.122 |
| 40 | 0.028 | 40 | 0.007 | 40 | 0.222 |
| 50 | 0.037 | 50 | 0.008 | 50 | 0.233 |
| 60 | 0.047 | 60 | 0.008 | 60 | 0.240 |
| 70 | 0.057 | 70 | 0.008 | 70 | 0.240 |
| 80 | 0.066 | 80 | 0.008 | 80 | 0.240 |
| 90 | | 90 | 0.008 | 90 | 0.240 | these data show the substantial increase in growth rate contained using the mixed culture. A differential count of the two organisms made during the experiment indicated that approximately 90 percent of the bacterial population in the mixed culture consisted of the Cellulomonas organisms. Other variations in the above-described method will suggest themselves to those skilled in the art and our invention is as claimed.

We claim:

1. A method for the preparation of nutritive protein from cellulose which comprises cultivating a cellulase-elaborating micro-organism and *Alcaligenes faecalis* on delignified cellulose under submerged aerobic conditions in an aqueous nutrient medium at a pH between about 5–9 and at a temperature between 25°–65° C.

2. A method according to claim 1 wherein the cellulose delignified by contact with alkali followed by oxidation.

3. A method according to claim 1 wherein insoluble residual cellulose is separated by filtration subsequent to cultivation.

4. A method according to claim 3 wherein the cellulase-elaborating micro-organism and *alcoligenes faecalis* cells produced are harvested after the residual cellulose is separated.

5. A method according to claim 1 wherein the cellulase-elaborating micro-organism is of the genus Cellulomonas.

6. A method for the preparation of nutritive protein from cellulose which comprises cultivating Cellulomonas species (ATCC No. 21399) and *Alcaligenes faecalis* strain (ATCC No. 21400) on delignified cellulose under submerged aerobic conditions in an aqueous nutrient medium at a pH about 7 and a temperature about 32° C.

* * * * *